(12) United States Patent
Adeeb

(10) Patent No.: US 7,287,248 B1
(45) Date of Patent: Oct. 23, 2007

(54) METHOD AND SYSTEM FOR THE GENERATION OF A VOICE EXTENSIBLE MARKUP LANGUAGE APPLICATION FOR A VOICE INTERFACE PROCESS

(75) Inventor: Ramy M. Adeeb, San Francisco, CA (US)

(73) Assignee: Tellme Networks, Inc., Mountain View, CA (US)

(*) Notice: Subject to any disclaimer, the term of this patent is extended or adjusted under 35 U.S.C. 154(b) by 675 days.

(21) Appl. No.: 10/285,894

(22) Filed: Oct. 31, 2002

(51) Int. Cl.
*G06F 9/44* (2006.01)
*G06F 9/45* (2006.01)
*G10L 11/00* (2006.01)

(52) U.S. Cl. ............... 717/136; 717/137; 717/106; 704/270.1; 704/275

(58) Field of Classification Search ........ 717/136–161, 717/114, 106; 704/260–275
See application file for complete search history.

(56) References Cited

U.S. PATENT DOCUMENTS

| | | | | |
|---|---|---|---|---|
| 5,633,916 | A * | 5/1997 | Goldhagen et al. | 397/67 |
| 2002/0194388 | A1* | 12/2002 | Boloker et al. | 709/310 |
| 2002/0198719 | A1* | 12/2002 | Gergic et al. | 707/500 |
| 2003/0083882 | A1* | 5/2003 | Schemers, III et al. | 704/270 |
| 2003/0139928 | A1* | 7/2003 | Krupatkin et al. | 704/260 |
| 2003/0147518 | A1 | 8/2003 | Albal et al. | 379/201.15 |
| 2003/0182305 | A1* | 9/2003 | Balva et al. | 707/103 R |
| 2003/0212561 | A1* | 11/2003 | Williams et al. | 704/270 |
| 2004/0093217 | A1* | 5/2004 | Yeh et al. | 704/270 |

OTHER PUBLICATIONS

Wrox Press, VoiceXML with XSLT (HTML and WML), Nov. 2001.*
Teppo et al., "Speech Interface Implementation for XML Browser," Aug. 1, 2001.*
Pabst, "XML sample Chapter: Early Adopter VoiceXML," Sep. 2002.*
Martin, "Adapting Content for VoiceXML," Aug. 2000.*
Marchal, "Managing exins with JavaMail and XSLT, part 1," Mar. 2001.*

* cited by examiner

*Primary Examiner*—Meng-Al T. An
*Assistant Examiner*—Insun Kang
(74) *Attorney, Agent, or Firm*—Perkins Cole LLP

(57) ABSTRACT

A method and system for Extensible Markup Language (XML) application transformation may include converting a call flow diagram describing a voice interface process into a list of states in a XML format, and creating a lookup table of audio states in the XML format by mapping a plurality of audio prompts and their corresponding textual representations with states of a list of states that play audio files associated with the plurality of audio prompts. The method and system may include creating an intermediate application in the XML format and from the list of states by merging audio prompts in the lookup table with states of the list of states that play audio files, and transforming the intermediate application into a second application of a second format that is a representation of the call flow diagram.

30 Claims, 8 Drawing Sheets

800

| 1.2.3 DemoMainGetHomePhone | | |
|---|---|---|
| Directory Name for the UI: 0300_demo/main/get_home_phone/ | | |
| Previous States | DemoCommonConfirmPhonenumberNo, DemoMainCellLanguage, DemoMainCellLanguageSpanish | |
| UI Prompts | | |
| TYPE | CONTENT | NOTES |
| Main Prompt | Please say or enter your home number, starting with the area code. | |
| Reprompt | | |
| Nomatch 1 | I'm sorry, I didn't get that. Please say or enter your home phone number. | |
| Nomatch 2 | I'm sorry, I still didn't get that. Please enter your home phone number. | |
| Noinput 1 | I'm sorry, I didn't hear you. Please say or enter your home phone number. | |
| Noinput 2 | I'm sorry, I still didn't hear you. Please enter your home phone number. | |
| Help | Please say or enter your home phone number. | |
| Inputs | | |
| DTMF | SPEECH | BEHAVIOR |
| | 650-428-0919 | Go to UsedVoice |
| Action Programming Notes | | |
| Next States | UsedVoice | |

FIGURE 8

METHOD AND SYSTEM FOR THE GENERATION OF A VOICE EXTENSIBLE MARKUP LANGUAGE APPLICATION FOR A VOICE INTERFACE PROCESS

BACKGROUND OF THE INVENTION

1. Field of the Invention

Embodiments of the present invention relate to the field of data processing systems having an audio user interface and is applicable to electronic commerce. More particularly, embodiments of the present invention relate generally to the generation of markup language applications for a voice interface process.

2. Related Art

As computer systems and telephone networks modernize, it has become commercially feasible to provide information to users or subscribers over a voice interface, e.g., telephone and other audio networks and systems. These services allow users, i.e., "callers," to interface with a computer system for receiving and entering information. As used herein, "caller" refers generically to any user interacting over an voice interface, whether via telephone or otherwise.

A number of these types of phone services utilize computer implemented automatic voice recognition tools (e.g., automated speech recognition systems) to allow a computer system to understand and react to a caller's spoken commands and information. This has proven to be an effective mechanism for providing information since telephone systems are ubiquitous, familiar to most people and relatively easy to use, understand and operate. When connected, the caller listens to information and prompts provided by the service and can speak to the service giving it commands and other information, thus forming a voice interface.

Additionally, these phone services can be integrated within the world wide web (e.g., Internet) to move audio data efficiently across the web to a telephonic user. More and more web devices will be developed to take advantage of the internet infrastructure for providing information data. In particular, voice can be used to interface with these phone services.

The phone service via a voice interface performs some task as requested or commanded by the user of the voice interface (e.g., information retrieval, electronic commerce, voice dialing, etc.). Once the task is understood and an overall process is outlined for accomplishing the task, a computer implemented application is written that provides the instructions necessary for allowing the user to interact with the voice interface to accomplish the task.

In particular, instructions for implementing the process can be written in the Voice Extensible Markup Language (VXML). The VXML language is a web-based markup language for representing human to computer dialogs, and is analogous to the Hypertext Markup Language (HTML). The VXML language interacts with a voice browser that outputs audio that is either recorded or computer generated. Also, the VXML language assumes that input through voice or telephone pad is provided as audio input. Additionally, VXML as a high-level, domain-specific markup language is currently being proposed to the World Wide Web Consortium (W3C) as the standard language for voice applications over the voice web marketplace.

Creating the particular VXML application for a particular phone service can be particularly time consuming and an inefficient use of human resources once the actual coding process begins. To create the VXML application, the process includes creating the design documents that outline the overall voice interface process as envisioned by the customer and the voice application developer. Next, the voice application is coded by hand in VXML from the design documentation to provide the instructions necessary for the user to interact with a phone service using the voice interface through a network.

Typically, a software developer is assigned the task of coding each of the various steps required in the voice interface process. At times, this becomes a redundant exercise as many sequences of instructions and various parts of the coded instructions are repeatedly used throughout the final coded voice application. Furthermore, as the voice interface process becomes more the amount of repetition and the chance for error in writing the code increases.

Moreover, once the VXML application is completed, additional documentation may be provided to the phone service in support of the voice application. Usually this additional documentation provides for further representations of the VXML application in a coded format (e.g., a web based representation of the voice interface process). However, additional time and resources are necessary to generate and code these further representations of the VXML application.

SUMMARY OF THE INVENTION

Accordingly, various embodiments of the present invention disclose a method and system for an extensible framework from which a Voice Extensible Markup Language (VXML) application can be automatically generated from design documentation of a voice interface process, thus utilizing human resources more efficiently, and reducing the chance for errors in writing the coded application. Moreover, embodiments of the present invention allow for the automatic generation of various other representations of a voice interface process, such as, hypertext markup language (HTML) documentation, or any other application based markup.

Specifically, embodiments of the present invention describe a method and system for Extensible Markup Language (XML) application transformation. Specifically, in one embodiment, a method is disclosed for the automatic generation of markup language applications (e.g., a VXML application) for a voice interface process.

A call flow diagram is converted into a list of states in an XML format. The call flow diagram is part of the design documentation that describes the steps to the voice interface process. Each of the steps in the call flow diagram is represented by a state in the list of states. Descriptions relating to the type of state and the next transition state are included in the list of states. As such, the list of states is a high level and intermediate representation of the call flow diagram.

Next, a lookup table of entries in XML is created to map audio prompts and their audio files with corresponding audio states in the list of states. The lookup table of entries is created from a textual format of a spreadsheet that displays a plurality of audio prompts for audio files and their corresponding textual representations with their corresponding states that play an audio file. More particularly, the lookup table of entries comprises an audio path to the location of each of the particular audio files, or the particular audio file itself.

Then, an intermediate application is created in the XML format by starting from the list of states along with their corresponding state and transition information, and in particular, merging corresponding entries in the lookup table with associated audio states. The intermediate application at this point is still a high-level XML representation of the call flow diagram and the voice interface process. The XML representation provides for a well defined and highly flexible representation of the voice interface process.

The intermediate application is then transformed into a second application of a second format that is a representation of the call flow diagram. Since the intermediate application is in a structured and well defined extensible XML format, transformation to other extensible and non-extensible mark-up languages is possible. In one embodiment, the second application is in a VXML format. In another embodiment, the second application is in an HTML format to provide for web page documentation of the voice interface process. In still another embodiment, the second application is in a text format to provide for test case documentation in a quality assurance capacity.

The transformation operations used to generate the VXML application from the intermediate XML representation of the call flow diagram are described in a three stage process, in one embodiment. First, each of the states and their associated information in the intermediate XML representation is transformed into preliminary VXML instructions. This is accomplished using a standard template that corresponds to the particular state that is being transformed. Second, features that have not been implemented in the XML code for the intermediate XML representation is fully expanded in the VXML code format. This provides for a detailed coded implementation of the voice interface process. Third, optimization of the VXML code is performed in order to streamline and conform to the VXML format. In particular, redundant states or steps are eliminated and various "if" steps are combined.

BRIEF DESCRIPTION OF THE DRAWINGS

FIG. 8 is an diagram of an exemplary web page illustrating the transformation of the intermediate application into the hypertext markup language format, in accordance with one embodiment of the present invention.

DETAILED DESCRIPTION OF THE INVENTION

Figure 1:
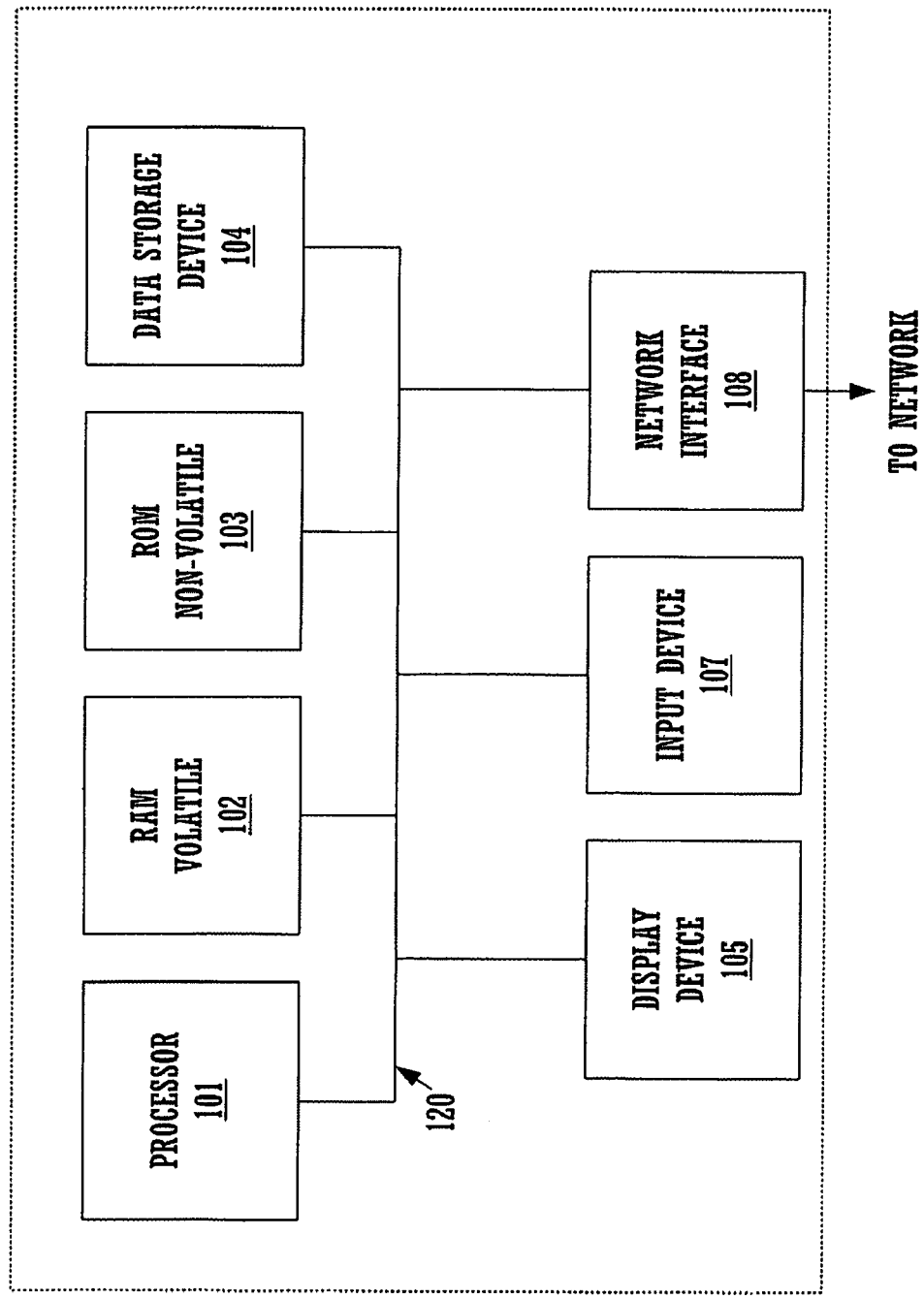
FIG. 1 is a logical block diagram of a computer system capabilities, in accordance with one embodiment of the present invention.

Reference will now be made in detail to the preferred embodiments of the present invention, a method of automatic generation of a Voice Extensible Markup Language (VXML) application from design documentation of a voice interface process, and a system for implementing the method, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Furthermore, in the following detailed description of the present invention, numerous specific details are set forth in order to provide a thorough understanding of the present invention. However, it will be recognized by one of ordinary skill in the art that the present invention may be practiced without these specific details. In other instances, well known methods, procedures, components, and circuits have not been described in detail as not to unnecessarily obscure aspects of the present invention.

Notation and Nomenclature

Some portions of the detailed descriptions which follow are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "creating," "transforming," "merging," "expanding,"'"optimizing," % "applying," "combining," "eliminating," or the like, refer to the action and processes of a computer system, or similar electronic computing device, including an embedded system, that manipulates and transforms data represented as physical (electronic) quantities within the computer system's registers and memories into other data similarly represented as physical quantities within the computer system memories or registers or other such information storage, transmission or display devices.

Referring to FIG. 1, embodiments of the present invention are comprised of computer-readable and computer-executable instructions which reside, for example, in computer-readable media of a computer system, such as a VXML generator. FIG. 1 is a block diagram of exemplary embedded components of such a computer system 100 upon which embodiments of the present invention may be implemented.

Exemplary computer system 100 includes an internal address/data bus 120 for communicating information, a central processor 101 coupled with the bus 120 for processing information and instructions, a volatile memory 102 (e.g., random access memory (RAM), static RAM dynamic RAM, etc.) coupled with the bus 120 for storing information and instructions for the central processor 101, and a non-volatile memory 103 (e.g., read only memory (ROM), programmable ROM, flash memory, EPROM, EEPROM, etc.) coupled to the bus 120 for storing static information and instructions for the processor 101. Computer system 100 may also include various forms of disc storage 104 for storing large amounts of information.

With reference still to FIG. 1, an optional signal Input/Output device 108 is coupled to bus 120 for providing a communication link between computer system 100 and a network environment. As such, signal Input/Output (I/O) device 108 enables the central processor unit 101 to communicate with or monitor other electronic systems or analog circuit blocks that are coupled to the computer system 100. The computer system 100 is coupled to the network (e.g., the Internet) using the network connection, I/O device 108, such as an Ethernet adapter coupling the electronic system 100 through a fire wall and/or a local network to the Internet.

An output mechanism may be provided in order to present information at a display 105 or print output for the computer system 100. Similarly, input devices 107 such as a keyboard and a mouse may be provided for the input of information to the computer system 100.

Voice Extensible Markup Language Generator

Accordingly, various embodiments of the present invention disclose a method and system for an extensible framework from which various markup language applications can be automatically generated from design documentation of a voice interface process, thus utilizing human resources more efficiently. Moreover, embodiments of the present invention allow for the automatic generation of various other representations of a voice interface process, such as, Hypertext Markup Language (HTML) documentation, or any other application based markup.

In one embodiment, the extensible framework generates a VXML application as a representation of a voice interface and is implemented via a gateway system running voice browsers that interpret a voice dialog markup language in order to deliver web content and services to telephone and other wireless devices.

The VXML language is a web-based markup language for representing human to computer dialogs, and is analogous to HTML. The VXML language assumes a voice browser with audio output that is either recorded or computer generated. Also, the VXML language assumes that audio input through voice or telephone pad is provided as audio input. VXML is an XML application that defines a tree-like structure that the user can traverse through using voice commands. A VXML Document Type Definition (DTD) defines the structure and grammar of a particular VXML application or related applications.

Figure 2:
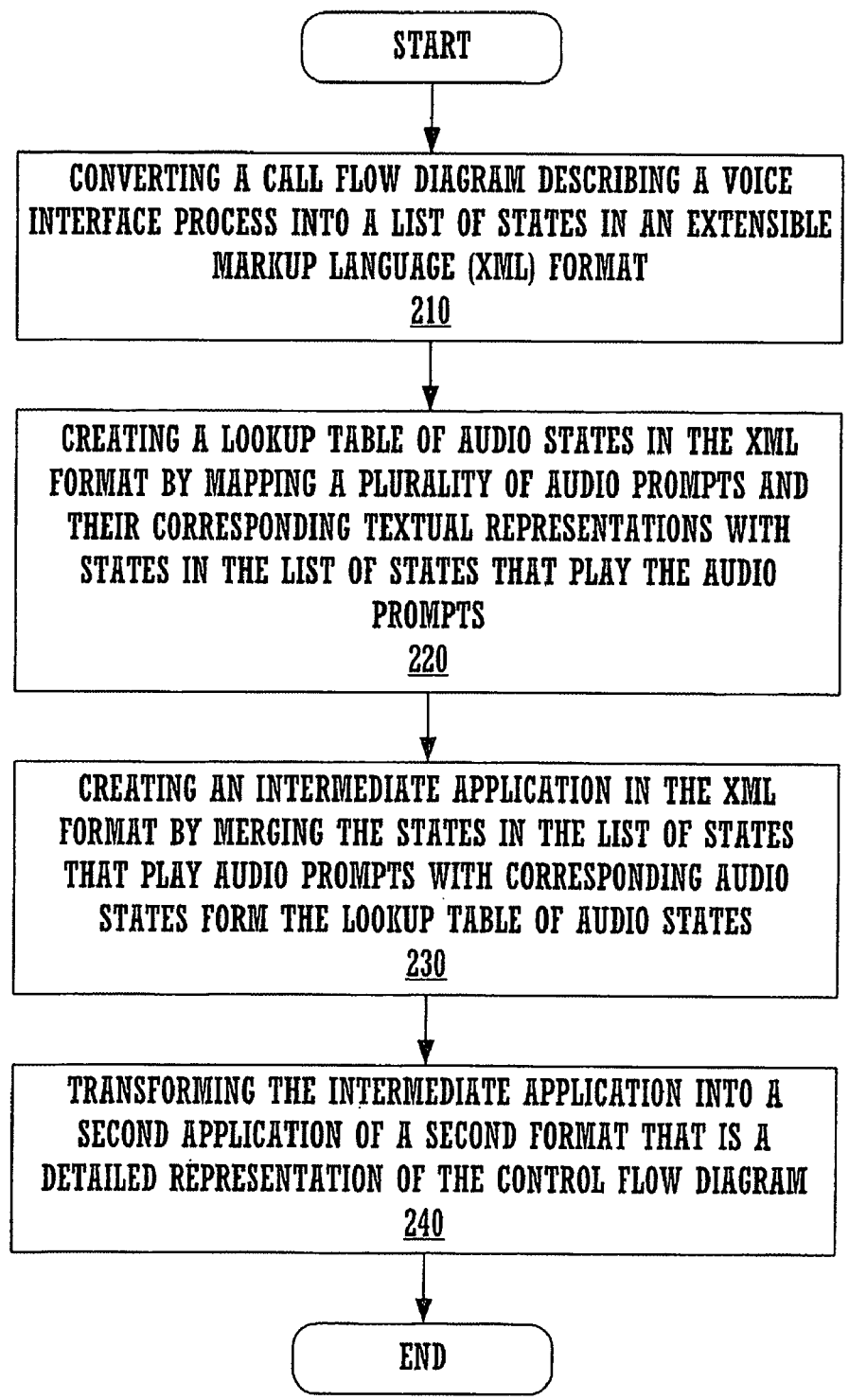
FIG. 2 is a flow chart of steps in a method for the transformation of design documentation into a web based application that is a detailed representation of the call flow of the design documentation, in accordance with one embodiment of the present invention.

FIG. 2 is a flow chart 200 of steps in a computer implemented method for the generation of applications from design documents describing a voice interface process, in accordance with one embodiment of the present invention. The method describes an extensible framework from which the generation of markup language applications from design documentation of a voice interface process is possible. The process disclosed in FIG. 2 is first discussed to provide a general overview to the method of generating a VXML application from design documentation. The particularities of the method is discussed in more detail with respect to the figures following FIG. 2.

The present embodiment begins by converting a call flow diagram into a list of states in an XML format, in step 210 of FIG. 2. In effect, the list of states comprises a finite state machine. The call flow diagram outlines each of the steps implemented in a voice interface process. As such, the list of states describes each of the steps in a voice interface process as outlined in the call flow diagram. The list of states provides for a high level representation of the call flow diagram of the voice interface process.

In step 220, the present embodiment creates a lookup table of audio states in the XML format that maps audio prompts to audio files to corresponding audio states in the list of states. The lookup table of audio states comprises an audio path that describes the web based path to the location of the audio file, and a textual representation of the audio file. In another embodiment, the lookup table of audio states comprises the actual audio file itself along with the textual representation of the audio file.

In step 230, the present embodiment creates an intermediate application representing the voice interface process in the aforementioned XML format. The intermediate application is created by merging the lookup table of audio states into the list of states. In particular, audio states in the lookup table are merged into corresponding states in the list of states playing an audio playback from an associated audio file.

In step 240, the present embodiment transforms the intermediate application in the XML format into a second application of a second markup language format. In one embodiment, the second application is of a HTML format, and wherein the second application is a source code for generating a web page comprising a tabular representation of the list of states including links between related states.

In another embodiment, the present embodiment transforms the intermediate application in the XML format into a second application of a VXML format. The generated VXML application is a static representation of the call flow diagram describing the voice interface, in one embodiment. As such, the static nature of the VXML application of the voice interface process allows the voice interface to be implemented in any browser environment using any supporting electronic device.

Figure 3:
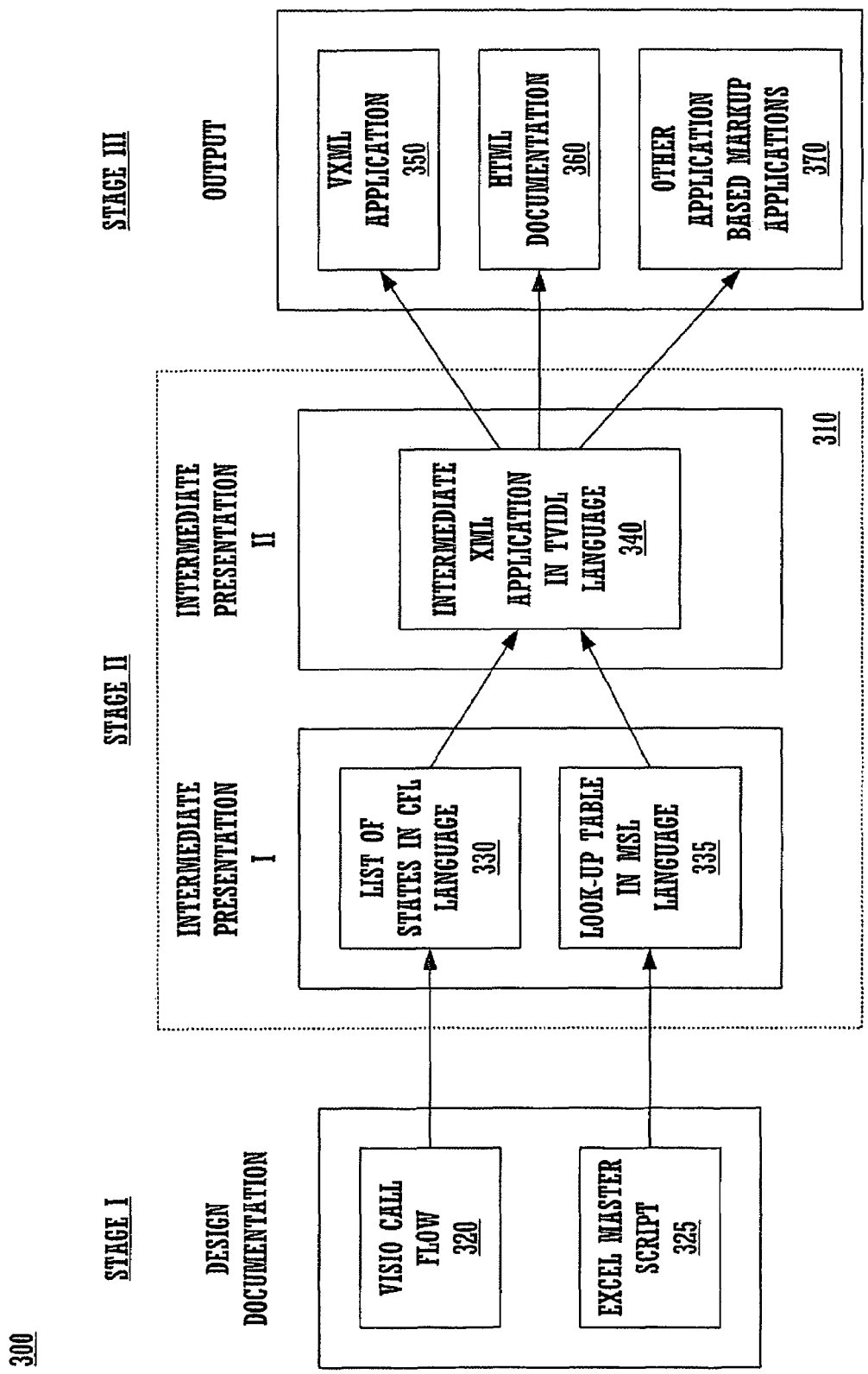
FIG. 3 is a data flow diagram illustrating the flow of data through the application generator, in accordance with one embodiment of the present invention.

FIG. 3 is a data flow diagram 300 illustrating the transformation of the design documentation describing a voice interface process into various applications representing the voice interface process through an markup application generator 310, in accordance with one embodiment of the present invention. A three stage process, as described in the flow chart 200, is illustrated in the data flow diagram 300.

In stage 1 of the data flow diagram 300, the user interface design of the voice interface process is documented as a call flow diagram 320. The call flow diagram 320 is a flow chart outlining the various steps and procedures necessary to implement the voice interface process. As such, the call flow diagram 320 is a high-level representation of the voice interface process.

Also, in stage 1 of the data flow diagram 300, the user interface design of the voice interface process is documented as a master script 325. The master script 325 represents a set of audio states with the audio prompts that are associated with corresponding states in the list of states that play an audio file. More particularly, the master script comprises the audio path through a network to each of the locations of audio files played by those states that play an audio file. In addition, the corresponding textual representations of the audio files are included within the master script 325. Also, the actual audio file can be contained in the master script 325, in one embodiment. As such, the audio path or audio files and their corresponding textual representations can be cross-referenced with the corresponding states that play an audio file.

In one embodiment, the master script 325 is created in a textual format, such as, the Excel spreadsheet format, and can be saved as a tab delimited text file. Moreover, the master script is written in normal script and not concatenated script, in one embodiment.

Both the call flow diagram 320 and the master script is inputted into the application generator 310 in stage 2 of FIG. 3, in one embodiment. In the first half of stage 2 of the data flow diagram 300, intermediate presentation 1, the call flow diagram 320 is converted into the XML format that conforms to a control flow language (CFL) outlined by a document type definition (DTD), in one embodiment. The conversion creates the list of states in the CFL language of the XML format, and corresponds to step 210 of FIG. 2.

The CFL document is an XML representation of an application consisting of one or more modules. Each of the modules is a collection of states, or more accurately, a finite state machine. As such, the CFL document is a list of states 330. Each of the states include the type of state, the name of the state, and the transitions between states. Embodiments of the present invention enable the conversion to the CFL format through a transformation script or through a web interface.

In one embodiment, the call flow diagram 320 is created using the Microsoft Visio application. By following a predetermined set of rules for representing the user interface design of a voice interface process in Visio, the application generator 310 through a transformation script can automatically transform the call flow diagram into the CFL format.

A document type definition (DTD) for XML scripts conforming to the CFL language is outlined below. It is appreciated that the CFL DTD is exemplary only, and that other DTDs can be created to transform the call flow diagram 320 into a corresponding XML format for further transformation. The exemplary CFL DTD is as follows in Table 1:

TABLE 1

```
<!--
* Call flow Language DTD. CFL is an XML
* representation of the Call flow of a Voice
* Application. CFL represents a finite state
* machine with a type and a name for each state
* and the transitions between states. CFL does not
* include any information on the inner components
* of the states or the associated output.
<!--
Describes an application as a finite state machine
of one or more states
-->
<!ELEMENT application (state+)>
<!--
Used to uniquely identify the state. Each state
has a type and unique name. Type can be one of six
different types:
start: start state, has one transition
fork, a state where a Boolean decision is evaluated
```

TABLE 1-continued

```
that determines the call flow. Has two
    elements, ontrue and onfalse
audio, A state where audio is queued, has one
    transition
input: A state where user input is obtained. Can
    have multiple transitions based on the user's
    input, determined through the idresult
    attribute of the transition tag
system: A state where system operation takes place
magicaudio: A state where audio is queued using the
    magic audio property
module: A link to a different module altogether.
End: The last state, only one per application.
    Has no child elements
-->
<!ELEMENT state {transition*, ontrue*, onfalse*,
    module*)>
<!ATTLIST state
    name ID #REQUIRED
    type (start|fork|audio|input|system|
        magicaudio|module|end) #REQUIRED
>
<!--
Defines a transition from one state to another.
Either one transition exists determining the next
state, or multiple transitions exist based on the
result of the current state in which case the
ifresult tag is used
-->
<!ELEMENT transition EMPTY>
<!ATTLIST transition
    next    CDATA #REQUIRED
    ifresult   CDATA #IMPLIED
>
<!--
Defines a transition for "fork" type states when
the result of the conditional is true
-->
<!ELEMENT ontrue EMPTY>
<!ATTLIST ontrue
    next CDATA #REQUIRED
>
<!--
Defines a transition for "fork" type states when
the result of the conditional is false
-->
<!ELEMENT onfalse EMPTY>
<!ATTLTST onfalse
    next CDATA #REQUIRED
>
<!--
Defines the module properties for "module" type
state name is the name of the module, while
location is the URI for the CFL representation of
the module
-->
<!ELEMENT module EMPTY>
<!ATTLIST module
    name    CDATA #REQUIRED
    location  CDATA #REQUIRED
>
```

Figure 7:
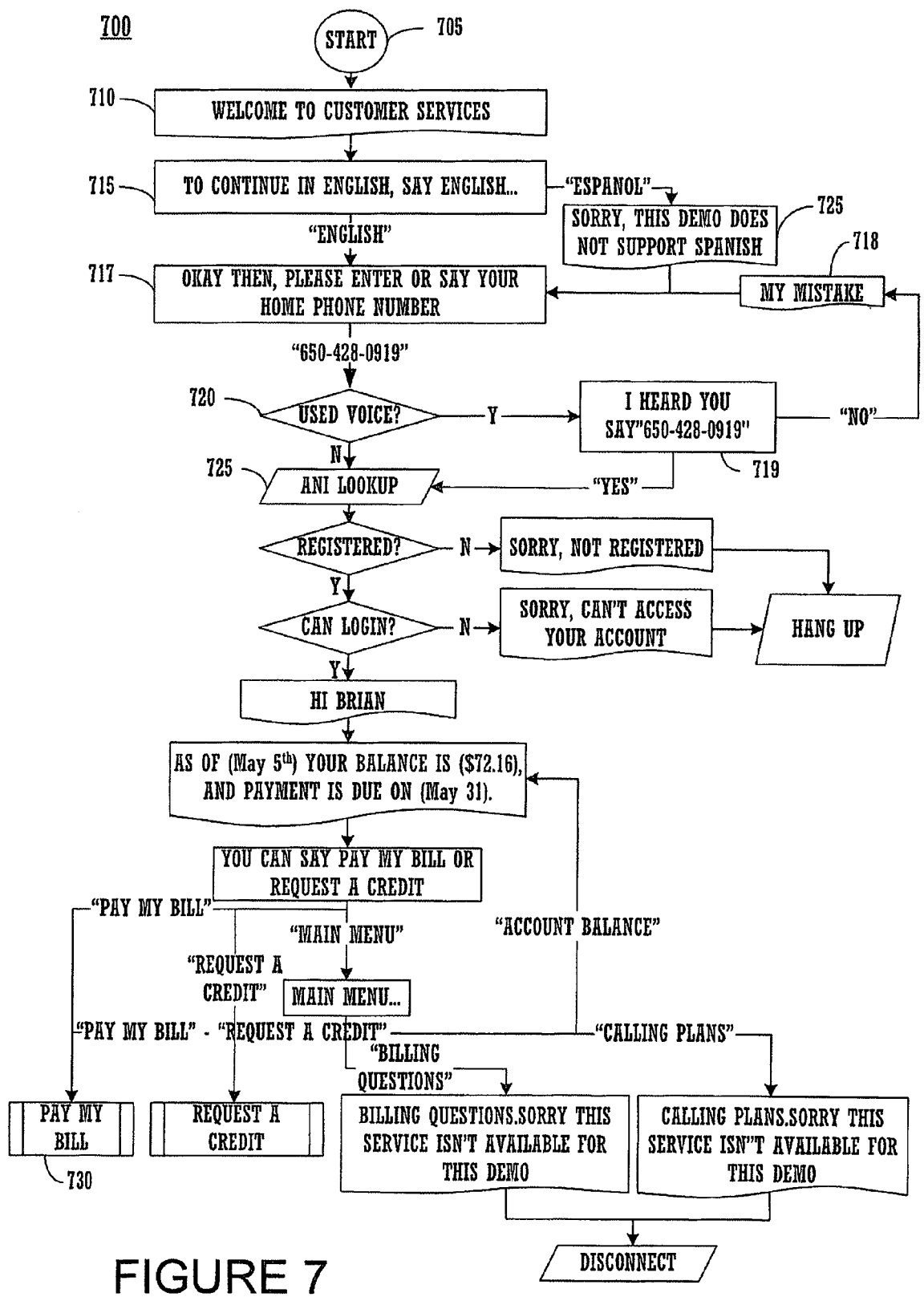
FIG. 7 is an exemplary call flow diagram of steps in a first module of states for services performed in connection with accessing account information via a voice interface process, in accordance with one embodiment of the present invention.

FIG. 7 illustrates a call flow diagram 700 of an exemplary voice interface process used as an example throughout this Specification, in accordance with one embodiment of the present invention. The call flow diagram 700 describes a voice interface allowing a user to interact with the consumer services division of a company in order to access an account balance.

An exemplary set of rules as outlined in the CFL DTD for representing the user interface design of a voice interface process is outlined in the following paragraphs, and as is shown in FIG. 7. It is appreciated that the predetermined set of rules can vary depending on the various approaches that can be implemented for transforming the call flow diagram 320 into the CFL language.

The Visio call flow is comprised of one or more modules that represent the call flow diagram 320. A module consists of a finite set of states, wherein each of the states is a represented block or step in the call flow diagram 320. For example, in FIG. 7, block 710 represents a non-interactive input state, where the voice interface application is not expecting a response from the user. More particularly, a module is specified using a set of states connected to each other via state transitions. In addition, a module must have exactly one start state. Module names must be unique throughout the application generated from the call flow diagram 320. Also, a module may reference other modules in the application via module states.

In one embodiment, modules may be internal (e.g., by copy) or external (e.g., by reference only). An internal module is a module that is not a standalone application. A Classic example is explicit confirmation. During implementation, internal modules are implemented by replacing the call to the module with the actual module code, hence the synonym "by copy."

On the other hand, an external module is one that can be a stand alone application. Examples of external modules Include functions like Main Menu, Address Capture, Package Tracking, and trading. An external module is implemented by referencing the module code, hence the synonym "By Reference."

In one embodiment, a state in a module is represented via a block shape in Visio. Each state may have zero or more state transitions depending on its type. A state transition is represented by connecting between the various blocks in the call flow diagram. A state transition may have associated text, depending on the type of the predecessor state. The text associated with state transitions is referred to as transition text.

A state must be one of the following types: start, input, binary fork, multiple fork, non-interactive audio, system, magic word, module, and end state. The state type is determined through the shape used to represent the state, as will be discussed as follows:

A start state is represented in the call flow diagram 320 using the shape of a circle. Block 705 of FIG. 7 is an example of a start state. A start state must have no predecessor. A start state must have exactly one successor. Transition text coming out of the start state is not required and will be ignored. A start state must have a state name that indicates the name of the module. The name can be specified either through the "State Name" property, or through the actual text inside the state shape. In addition, a start state must have a "Module Type" property indicating the type of the module.

An input state is represented using the "Input or Form" square box. Block 715 of FIG. 7 is an example of an input state. An input state is one where user is prompted for an input that is then recognized against a grammar. An input state must have one or more predecessor. An input state must have one or more successors. Transitions to the next step or block indicate the input result associated with the transition. At most one transition out of an input state may have no associated text, in which case it will be considered the default transition. The "Audio Path" custom property for an input state must be specified. It must match a path in the associated master script of the lookup table 325.

A binary fork state is represented using the "Fork Decision" diamond box. Block 720 of FIG. 7 is an example of a binary fork state. A binary fork state indicates the performance of a Boolean decision that is either true or false. A binary fork state must have one or more predecessors. Also, a binary fork state must have exactly two successors. Transitions out of the binary fork states must have the associated text "YES" and "NO".

A multiple fork state is represented using the "Fork Decision" diamond box. A multiple fork state indicates forking the call flow into various paths depending on the value of a certain variable or state. A multiple fork state must have one or more predecessor. A multiple fork state must have at least two successors. Transitions out of the multiple fork state can have associated text. At most one transition out of a multiple fork state may have no associated text, in which case it will be considered the default transition.

A non-interactive audio state is represented using the "non-interactive audio" box. Block 725 of FIG. 7 represents a non-interactive audio block. A non-interactive audio state must have one or more predecessor. A non-interactive audio state must have exactly one successor. Transition text coming out of the non-interactive audio block is not necessary. The "audio path" property for a non-interactive audio state must be specified. It must match a path in the associated lookup table in the master script 325.

The non-interactive state has a required "Function" property. The "function" can be either "Queue Audio" or "Queue and Play Audio". "Queue Audio" is the default value and means the audio will be queued but will not be played until the next listen state. "Queue and Play Audio" means the audio will be played in the current state. If the audio is played, no special state grammar will be active but the user will be allowed to utter any of universal commands recognized by the application generated by the application generator 310.

A system process state represents one of the various system functions. Block 725 of FIG. 7 illustrates a system state. A system process state must have one or more predecessor. A system process state may have 0 or 1 successors depending on the system function. Functions include: Transfer, Record, Application Programming Interface (API) Call, Data, and Disconnect. Transfer Function represents a call transfer, and may or may not have a successor. Record represents a recording state. A Record state must have one successor. The API Call is a call to an external API through the data tag. API Calls must have one successor. The data function is where actual manipulation of data takes place. Data manipulation implies assigning values to variables that are used later in the application. Data functions must have one successor. Disconnect function ends the call by hanging up on the user. A disconnect function may have no successors implying end of the call, or may have one successor implying post hang up processing.

A magic-word content audio state is represented using the "magic-word content" box. The application implementing the call flow diagram 320 can be interrupted with a particular "magic-word," but otherwise in not interruptible. A magic-word content state must have one or more predecessor. A magic-word content state must have exactly one successor. Transition text on coming out of the magic-word state is not necessary.

A module state is represented using the "subroutine or module" box. Block 730 of FIG. 7 illustrates a module block. A module state must have one or more predecessor. A Module state may have either no or one successors. A module is allowed to have a successor if and only if the actual called module has a return state. The actual module to be called needs to be specified either through the "Module" property of the state. If the "Module" property is empty, the state text is used instead.

An end state is represented using the "End" circle box. An end state is only allowed in internal modules. External Modules may or may not have an end state. An end state must have one or more predecessor. An end state can not have a successor. An end state must be one of two types: "Return" end state or "Reprompt" end state. The end state type is specified through the state text. A "Return" state implies returning from the current module. The transition to the return state is replaced with a transition to the, then required, successor to the calling module state. A "Reprompt" state implies transitioning to a previously visited prompt state. The transition to the "Reprompt" state will be replaced with a transition to the first input state that is a predecessor of the actual module state.

An exemplary example of the list of states 330 in the CFL language is provided below. The example of the list of states 330 in the CFL language corresponds to a portion of the blocks in FIG. 7 (blocks 705, 710, 715, 717, 718, 719, 720, and 725) as outlined below in Table 2. Corresponding blocks are noted in enclosed brackets, such as, (block 705).

TABLE 2

```
</module>
<module name="Main" type ="external">
    (block 705)
    <state type="start" name= "Main"">
    <transition next= "DemoMainWelcome"/>
    <state> (block 710)
        <state type="audio"
name="DemoMainWelcome>
audiopath="0300_demo/main/welcome/">
            <transition next=
"DemoMainGetLanguage"/>
        </state> (block 715)
        <state type="input"
name="DemoMainGetLanguage"
audiopath="0300_demo/main/get-language/">
            <transition next=
"DemoMainGetHomePhone" ifresult="English"/>
            <transition next=
"DemoMainGetLanguageSpanish" ifresult="Espanol"/>
        </state> (block 717)
        <state type="input"
name="DemoMainGetHomePhone" audiopath=
"0300_demo/main/get_home_phone/">
            <transition next="UsedVoice"
ifresult="650-428-0919"/>
        </state> (block 725)
        <state type="audio"
name="DemoMainGetLanguageSpanish" audiopath="0300_demo/
main/get_language/ spanish.wav">
            <transition next=
"DemoMainGetHomePhone"/>
        </state> (block 720)
        <state type="fork" name="Usedvoice">
            <transition next=
"DemoCommonConfirmPhonenumber" ifcond="true"/>
            <transition next="AniLookup"
ifcond="false"/>
            <feature name="used_voice"/>
        </state> (block 725)
        <state type="system" name="AniLookup">
            <transition next="Registered"/>
            <property name="Function"
value="Data"/>
```

Returning back to FIG. 3, the master script 325 text document containing the audio prompts is converted into the XML format that conforms to a master script language (MSL) outlined by a document type definition (DTD), in one embodiment. The MSL document is an XML representation of the states that play an audio file. The MSL document represents a look-up table of audio states 335 with the audio prompts necessary for states in the list of states to play their associated audio files. Conversion to the look-up table of audio states 335 corresponds to step 220 of FIG. 2. Embodiments of the present invention enable the conversion to the MSL language through a transformation script or through a web interface.

A document type definition (DTD) for XML scripts conforming to the MSL language is outlined below. It is appreciated that the MSL DTD is exemplary only, and that other DTDs can be created to transform the master script 325 into a corresponding XML format for further transformation. The exemplary MSL DTD is as follows in Table 3:

TABLE 3

```
<!--
* Master Script Language DTD. MSL is an XML
* representation of the Master Script submitted
* with a Voice Application. MSL represents a set
* of states with the audio prompts played in each
* state. MSL does not describe the transitions
* between the states or their relationship to each
* other.
-->
<!--
Describes an application as a set of one or more
states
-->
<!ELEMENT application (state+)>
<!--
Used to uniquely identify the state. Each state has
a name and an optional audiopath as attributes. A
state can have audio elements as direct children,
or can have audio elements grouped together under
some sub-stat one of: ni1. ni2, nm1, nm2, nm3, and
help.
-->
<!ELEMENT state (audio*, feature*, ni1?, ni2?,
    nm1?, nm2?, nm3?, help?)>
<!ATTLIST state
    name ID #REQUIRED
    audiopath CDATA #IMPLIED
>
<!--
audio can be either a file, or the playback of some
variable, such as on playing back a phone number
obtained at the state GetPhoneNumber. In this case
value will be GetPhoneNumber and type will be
phoneNumber. Value is used to determine the data
flow, while type is used to determine the
JavaScript function used to generate the audio
-->
<!ELEMENT audio EMPTY>
<!ATTLIST audio
    src     CDATA #IMPLIED
    tts     CDATA #IMPLIED
    value   CDATA #IMPLIED
    type    CDATA #IMPLIED
>
<!--
Intrastate components
-->
<!ELEMENT ni1 (audio*)>
<!ELEMENT ni2 (audio*)>
<!ELEMENT nm1 (audio*)>
<!ELEMENT nm2 (audio*)>
<!ELEMENT nm3 (audio*)>
<!ELEMENT help (audio*)>
<!--
feature
-->
<!ELEMENT feature EMPTY>
<!ATTLIST feature
    name CDATA #REQUIRED
    id   CDATA #REQUIRED
>
```

An exemplary example of the look-up table of audio states 335 in the MSL language of the XML format is provided below. The example of the look-up table of audio states in the MSL language corresponds to block 717 of FIG. 7 as outlined below in Table 4.

TABLE 4

```
        </state>
        <state name="0300DemoMainGetHomePhone"
audiopath="0300_demo/main/get_home_phone/"
type="input">
                <audio src="prompt.wav" tts="Please say
or enter your home number, starting with the area
code."/>
                <ni1>
                        <audio src="ni1.wav" tts="I'm
sorry, I didn't hear you. Please say or enter
your home phone number."/>
                </ni1>
                <ni2>
                        <audio src="ni2.wav" tts="I'm
sorry, I still didn't hear you. Please enter
your home phone number."/>
                </ni2>
                <nm1>
                        <audio src="nm1.wav" tts="I'm
sorry, I didn't get that. Please say or enter
your home phone number."/>
                </nm1>
                <nm2>
                        <audio src="nm2.wav" tts="I'm
sorry, I still didn't get that. Please enter
your home phone number."/>
                </nm2>
                <nm3>
                        <audio src="nm3.wav" tts="I'm
sorry, I'm having trouble understanding. Using
your telephone keypad, please enter your home phone
number."/>
                </nm3>
                <help>
                        <audio src="help.wav" tts="Please
say or enter your home phone number."/>
                </help>
        </state>
```

Returning back to FIG. 3, in part 2 of stage 2, the intermediate presentation II, the list of states 330, which conforms to the CFL language, and the look-up table of audio states 335, which conforms to the MSL language, are combined together into an XML representation of the entire user interface design documents (e.g., the call flow diagram 320 and the master script 325). The combined XML representation is referred to an intermediate XML application, and corresponds to step 240 of FIG. 2.

In one embodiment, the combined XML representation is referred to as the Tellme User Interface Design Language, or TUIDL. The TUIDL document represents an application as a set of modules. Each module is a finite state machine. The actual content of the state and the transition between states is explicitly specified as a high level representation of the voice interface process.

A document type definition (DTD) for XML scripts conforming to the TUIDL language is outlined below. It is appreciated that the TUIDL DTD is exemplary only, and that other DTDs can be created to merge the look-up table 335 of audio states with the list of states 330 master script 325. The exemplary TUIDL DTD is as follows in Table 5:

TABLE 5

```
<!--
 * Tellme User Interface Design Language DTD. TUIDL
 * is an XML representation of the complete design
 * of the User Interface Voice Application. TUIDL
 * represents an application as a set of modules.
```

TABLE 5-continued

```
 * Each module is a finite state machine. The actual
 * content of the state and the transition between
 * states is explicitly specified.
 * of each state
 -->
<!--
Describes an application as a finite state machine
of one or more modules
-->
<!ELEMENT application (module+)>
<!--
Used to uniquely identify a module. Each module
has a type and unique name. Type can be either
internal or external
-->
<!ELEMENT module (state+)>
<!ATTLIST module
    name ID #REQUIRED
    type (internal|external) #IMPLIED
>
<!--
Used to uniquely identify the state.
Children include:
transition: transition to the next state
property: Set of state specific properties
feature: UI Features to be applied to the state
-->
<!ELEMENT state (property | feature | transition |
audio | ni1 | ni2 | nm1 | nm2 | nm3 | help)*>
<!--
Attributes for a state include:
name: Required ID
audiopath. Required for states where audio is
queued
type. Can be one of:
    start: start state, has one transition
    fork: a state where a Boolean decision is
        evaluated that determines the call flow.
        Has two elements, on true and onfalse
    audio: A state where audio is queued. has one
        transition
    multiplefork: a state where a forking takes
        place
    input: A state where user input is obtained.
    Can have multiple transitions based on the
        user's input, determined through the
        idresult attribute of the transition tag
    system: A state where system operation takes
        place. Can have anywhere between 0-2
        transitions
    magicaudio: A state where audio is queued
        using the magic audio property module. A
        link to a different module.
    return:
    reprompt:
    end: The last state in a module. Has no child
        elements
-->
<!ATTLIST state
    name ID #REQUIRED
    type (start | fork | multiplefork |
audio | input | system | magicaudio | module |
return | reprompt | end) #REQUIRED
    audiopath CDATA #IMPLIED
<
<!--
audio can be either a file, or the playback of some
variable, such as on playing back a phone number.
value is used to determine the data flow, while
type is used to determine the JavaScript function
used to generate the audio
-->
<!ELEMENT audio EMPTY>
<!ATTLIST audio
    src     CDATA #IMPLIED
    tts     CDATA #IMPLIED
    value   CDATA #IMPLIED
    type    CDATA #IMPLIED
>
```

TABLE 5-continued

```
<!--
Intrastate components for input states
-->
<!ELEMENT ni1 (audio*)>
<!ELEMENT ni2 (audio*)>
<!ELEMENT nm1 (audio*)>
<!ELEMENT nm2 (audio*)>
<!ELEMENT nm3 {audio*)>
<!ELEMENT help (audio*)>
<!--
Defines a transition from one state to another.
Either one transition exists determining the next
state, or multiple transitions exist based on the
result of the current state in which case the
ifresult tag is used
-->
<!ELEMENT transition EMPTY>
<!ATTLIST transition
    next CDATA #REQUIRED
    ifresult CDATA #IMPLIED
    ifcond (true|false) #IMPLIED
>
<!ELEMENT property EMPTY>
<!ATTLIST property
    name CDATA #REQUIRED
    value CDATA #IMPLIED
>
<!ELEMENT feature EMPTY>
<!ATTLIST feature
    name CDATA #REQUIRED
    value CDATA #IMPLIED
>
```

The merging of the list of state 330 in the CFL language and the look-up table of audio states 335 in the MSL language is accomplished through mapping the audiopath properties of the various states of the CFL document 330 with the audio path of the various states of the master script 335. States in the CFL document 330 may maintain a many to one relationship with states in the MSL document 335, e.g., more than one state in the CFL document 330 may map to the same audio state playing an audio file in the MSL document 335. However, at most one audio state in the MSL document 335 may map into a state in the CFL document.

The merging of the look-up table of audio states 335 with the corresponding audiopath properties of states playing an audio file in the list of states 330 corresponds to step 230 of FIG. 2. As such, the merging of the audiopath properties into corresponding states playing an audio file in the list of states is a high level XML representation of the voice interface process.

Figure 4:
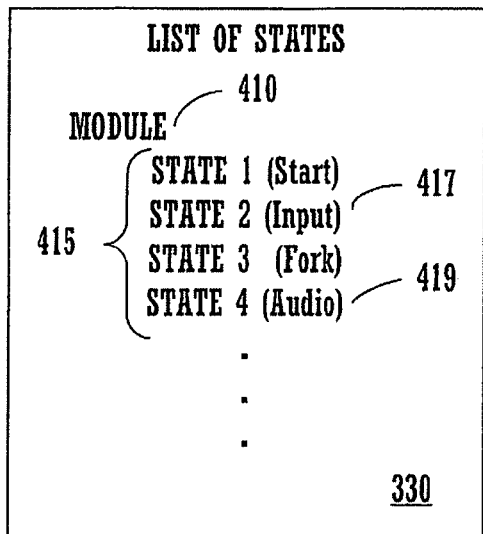
FIG. 4 is a data flow diagram illustrating the merging of audio states including audio prompts from a look-up table with corresponding states that play audio files corresponding to the audio prompts during the creation of the intermediate XML application, in accordance with one embodiment of the present invention.
Figure 4:
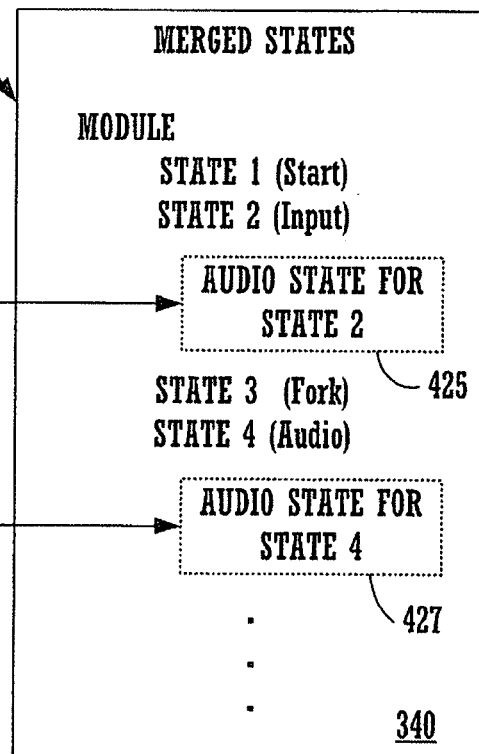
Figure 4:
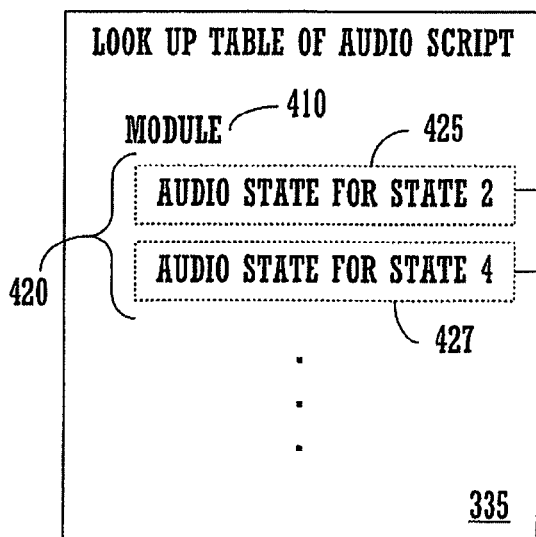

FIG. 4 is a data flow diagram 400 illustrating the merging of the audio prompts in the look-up table 335 of audio states with corresponding states in the list of states 330 conforming to the CFL language. In the list of states 330, a module 410 is presented in a state machine format. A collection of states 415 comprises module 410 and includes a states 1, 2, 3, 4, etc. State 2 containing states 417 and state 4 containing state 419 are states that play an audio file.

In the look-up table 335, audio path properties are contained in audio script for each of the states in the list of states that play an audio file. A plurality of audio states 420 containing audio prompts for each of the states playing an audio file comprises the look-up table 335 in the MSL language. The audio states refer to audiopath properties for the playing of the audio files. For example, the audiopath properties 425 for input state 2 and the audio path properties 427 for the audio state 4 are illustrated.

To create the TUIDL document 340, the list of states in the CFL language is merged with the look-up table 335 containing the audio path properties for audio files that are played, in one embodiment of the present invention. In essence, each of the audio path properties are incorporated directly into corresponding states that play an audio file. For example, the audio path properties 425 for state 2 are directly incorporated into state 417 corresponding to input state 2. Also, the audio path properties 427 for state 4 are directly incorporated into the state 419 corresponding to input state 4.

An exemplary example of the intermediate XML application 340 in the TUIDL language is provided below, and corresponds to a portion of the blocks in FIG. 7 (blocks 717, 725, and 720) as outlined below in Table 6. Corresponding blocks are noted in enclosed brackets, such as, (block 717).

TABLE 6

```
</state>      (Block 717)
<state type="input"
name="DemoMainGetHomePhone"
audiopath="0300_demo/main/get_homephone/">
        <transition next="UsedVoice"
ifresult="650-428-0919"/>
        <audio src="prompt.wav" tts="Please say
or enter your home number, starting with the area
code."/>
        <ni1>
            <audio src="ni1.wav" tts="I'm sorry,
I didn't hear you. Please say or enter your home
phone number."/>
        </ni1>
        <ni2>
            <audio src="ni2.wav" tts="I'm sorry,
I still didn't hear you. Please say or enter your
home phone number."/>
        </ni2>
        <nm1>
            <audio src="nm1.wav" tts="I'm sorry,
I didn't get that. Please enter your home phone
number."/>
        </nm1>
        <nm2>
            <audio src="nm2.wav" tts="I'm sorry,
I still didn't get that. Please enter your
home phone number."/>
        </nm2>
        <nm3>
            <audio src="nm3.wav" tts="I'm sorry,
I'm having trouble understanding. Using your
telephone keypad, please enter your home phone
number."/>
        </nm3>
        <help>
            <audio src="help.wav" tts="Please
say or enter your home phone number."/>
        </help>
    </state>      (BLOCK 725)
    <state type="audio"
name="DemoMainGetLangl1ageSpanish"
audiopath="0300_demo/main/get_language/">
        <transition next="DemoMainGetHomePhone"/>
        <audio src="spanish.wav" tts="Sorry, this demo
doesn't support Spanish. Now continuing in English."/>
    </state>      (BLOCK 720)
    <state type="fork" name="UsedVoice">
        <transition next=
"DemoCommonConfirmPhonenumber" ifcond="true"/>
        <transition next="AniLookup"
ifcond="false"/>
        <feature name="used_voice"/>
. . .
```

In another embodiment, in the design phase, the audio prompts are not separated from the call flow diagram 320. In that case, the CFL document 330 and the MSL document 335 would be unnecessary. Instead, two inputs are directly used in part 2 of stage 2, the intermediate presentation II. As inputs, the list of states, and corresponding audio paths with their textual representations are used to create the intermediate XML application that represents the voice interface process.

As such, the application generator 310 establishes an extensible framework allowing the generation of the various markup language application from the design documentation. The extensible manner of the application generator 200 allows for the generation of VXML application, HTML applications, or any other application based markup applications, as an output.

To implement the transformation, the intermediate XML application 340 is transformed into applications of various formats, in one embodiment of the present invention. The XML format is a general and highly flexible representation of any type of data. As such, transformation to any markup language based application can be systematically performed in an extensible manner.

As shown in FIG. 3, the application generator 310 can transform the intermediate XML application 340 into a VXML application 350 that is a static representation of the call flow diagram 320, in one embodiment. As such, the static nature of the VXML application 350 of the voice interface process allows the voice interface to be implemented in any browser environment using any supporting electronic device.

The application generator 310 can also transform the intermediate XML application 340 into an HTML application 360, in one embodiment. As such, the HTML application 360 is a source code for generating a web page comprising a tabular representation of the list of states with links between related states.

FIG. 8 is a diagram illustrating the web page or the HTML document 800 for block 717 of FIG. 7 which corresponds to the "DemoMainGetHomePhone" state. The HTML document 800 corresponds to the voice interface process as outlined in the call flow diagram 320. In the HTML document 800 is presented in tabular format in one embodiment, but could easily be presented in other formats in other embodiment. The directory name for the state is presented in cell 810. The various audio prompts and files that are played are displayed in logical fashion to present an overall process view of the voice interface. For example, the main prompt is presented in cell 820.

The transition state is presented in cell 860. As an added feature in the HTML document 800, links to other states in the HTML document 800 can also be provided, in one embodiment. As such, by clicking on the link to "UsedVoice," the portion of the HTML document corresponding to the "UsedVoice" state would be presented.

The application generator 310 can also transform the intermediate XML application 340 into any other application based markup, or any textual format, in one embodiment of the present invention. For example, the application generator 310 can transform the XML application 340 into an application of a text format, wherein the textual application is a quality assurance (QA) application that is used for testing performance of the VXML application 350.

The application generator 310 is not limited to creating certain functionalities of a voice interface application, but is designed in an extensible fashion allowing the generation of VXML coded applications that can perform any task, as long as the task can be represented in a clear and well defined set of VXML instructions.

Figure 5:
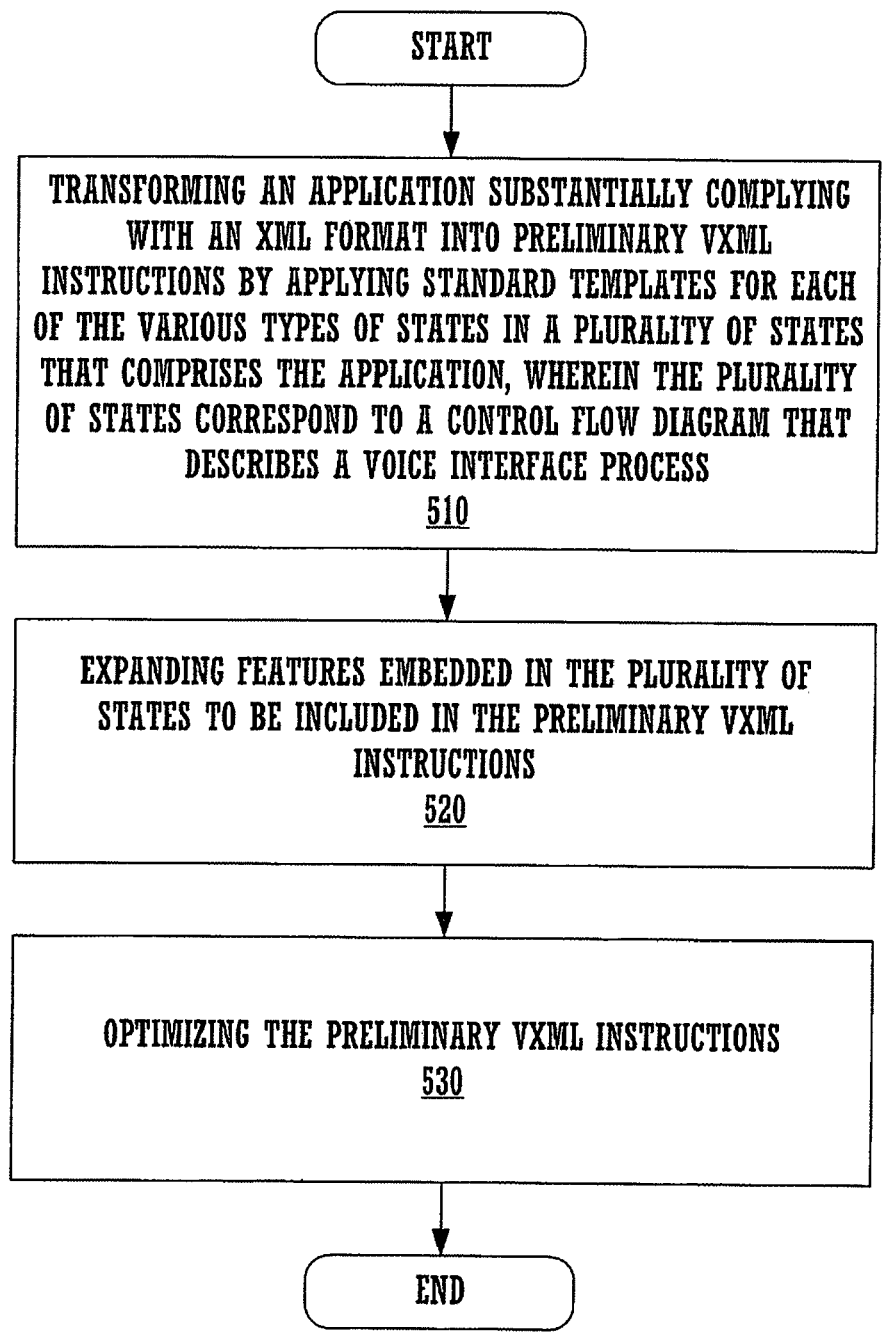
FIG. 5 is a flow chart of steps in a method for the transformation of design documentation to a VXML application that is a detailed representation of the call flow from the design documentation, in accordance with one embodiment of the present invention.

FIG. 5 is a flow chart 500 of steps illustrating a method for converting the intermediate XML application 340 in the TUIDL language into a VXML application 350, in accordance with one embodiment of the present invention. The conversion occurs in a three step process. In step 510, the present embodiment transforming each state in the intermediate XML application into preliminary VXML instructions. Standard templates are used to convert each state in the intermediate XML application 340 into a default VXML instruction or representation.

Figure 6:
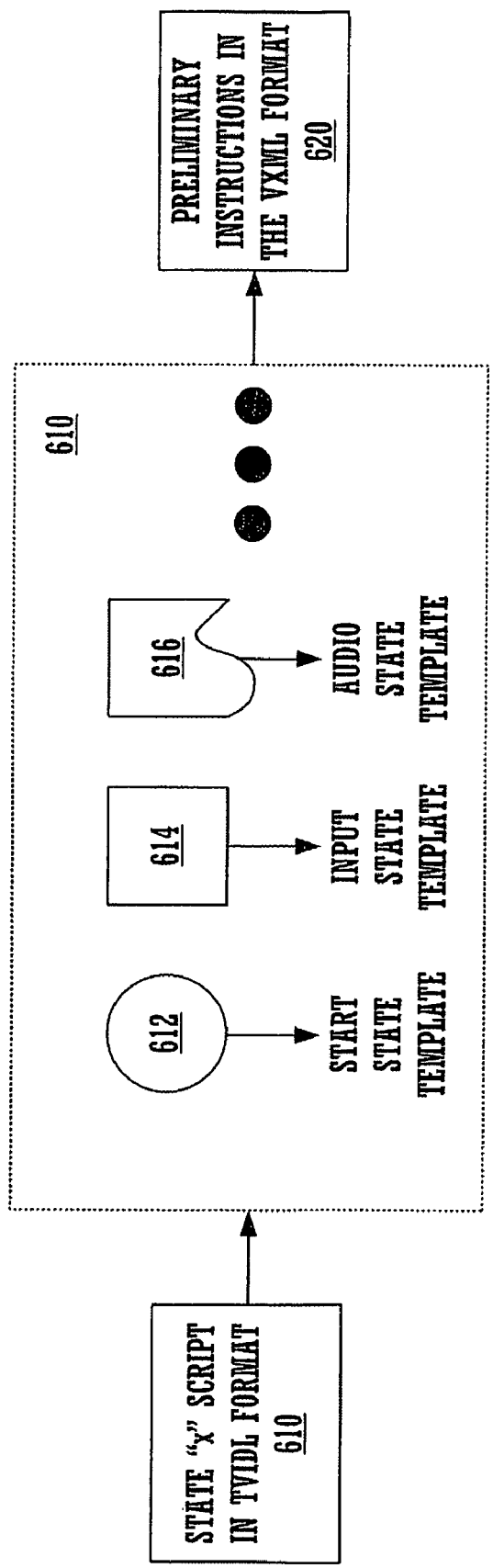
FIG. 6 is a data flow diagram illustrating the flow of data to transform scripts of states in the intermediate XML application into default preliminary VXML instructions, in accordance with one embodiment of the present invention.

FIG. 6 is a diagram illustrating the application of the standard templates to convert states in the intermediate XML application into VXML instructions. FIG. 6 corresponds to the process illustrated in step 510 of FIG. 5. The script 610 for state "x" in the intermediate XML application has a defined state type. The standard template for the state type corresponding to state "x" is applied to the script 610 in the conversion process to VXML instructions.

A plurality of standard templates 610 can be applied to the script 610 in order to convert the script for state "x" into VXML instructions. Embodiments of the present inventions include numerous standard templates for converting script for states into default VXML instructions, including numerous standard templates for a single type of state. The selected standard templates are chosen according to design preference.

In FIG. 6, the plurality of standard templates includes the start state template 612. Should the script 610 be of the start type, the template 612 would be applied to the script 610 to generate preliminary VXML instructions 620. Should the script 610 be of the input state type, the template 614 would be applied to the script 610 to generate corresponding preliminary VXML instructions 620. Similarly, should the script 610 be of the audio state type, the template 614 would be applied to the script 610 to generate corresponding preliminary VXML instructions 620. This process would occur for every state in the intermediate XML application.

An exemplary example of application of the plurality of standard templates 610 is provided below, and corresponds to the generation of VXML instructions for the blocks surrounding block 717 of FIG. 7. The VXML instructions are outlined below in Table 7:

TABLE 7

```
<!--**************************************************
* State: DemoMainGetHomePhone
**************************************************-->
<form id="DemoMainGetHomePhone">
    <field name="DemoMainGetHomePhone">
        <grammar src="demomaingethomephone.gsl"/>
        <prompt>
            <audio expr="appsAudioRootPath +
'0300_demo/main/get_home_phone/prompt.wav'">
                Please say or enter your home
number, starting with the area code.
            </audio>
        </prompt>
        <!--*****************************************
        Nomatch Handlers
        *****************************************-->
        <nomatch count="1">
            <audio expr="appsAudioRootPath +
'0300_demo/main/get_home_phone/nm1.wav'">
                I'm sorry, I didn't
get that. Please say or enter your home phone
number.
            </audio>
        </nomatch>
        <nomatch count="2">
            <audio expr="appsAudioRootPath +
'0300_demo/main/get_home_phone/nm2.wav'">
                I'm sorry, I didn't
get that. Please enter your home phone number.
            </audio>
```

TABLE 7-continued

```
        </nomatch>
        <nomatch count="3">
            <audio expr="appsAudioRootPath +
'0300_demo/main/get_home_phone/nm3.wav'">
                I'm sorry, I'm
having trouble understanding. Using your telephone
keypad, please enter your home phone number.
            </audio>
        </nomatch>
<!--******************************************
            Noinput Handlers
******************************************-->
        <noinput count="1">
            <audio expr="appsAudioRootPath +
'0300_demo/main/get_home_phone/ni1.wav'">
                I'm sorry, I didn't hear
you. Please say or enter your home phone number.
            </audio>
        </noinput>
        <noinput count="2">
            <audio expr="appsAudioRootPath +
'0300_demo/main/get_home_phone/ni2.wav'">
                I'm sorry, I still
didn't hear you. Please enter your home phone
number.
            </audio>
        </noinput>
        </help>
            <audio expr="appsAudioRootPath +
'0300_demo/main/get_home_phone/help.wav'">
                Please say or enter your home
phone number.
        <filled>
            <goto next="#UsedVoice"/>
        </filled>
    </field>
</form>
<form id="DemoMainGetLanguageSpanish">
    <block>
        <audio expr="appsAudioRootPath +
'0300_demo/main/get_language/spanish.wav'">
            Sorry, this demo doesn't
support Spanish. Now continuing in English.
        </audio>
        <goto next="#DemoMainGetHomePhone"/>
    </block>
</form>
<form id="UsedVoice">
    <block>
        <if cond="UsedVoice{}">
            <goto
next="#DemoCommonConfirmPhonenumber"/>
            <else/>
                <goto next="#AniLookup"/>
            </if>
    </block>
</form>
<form id="AniLookup">
    <block>
        <!-- TODO Please insert functionality for
system state AniLookup of Function: Data -->
        <goto next="#Registered"/>
    </block>
</form>
```

Returning now back to flow chart 500 of FIG. 5, in step 520, the present embodiment expands features embedded in the states in the intermediate XML application to be included in the preliminary VXML instructions. As such, user interface features are applied to the generated VXML instructions implementing commonly used logic and functionality. In other words, features are coded tasks that are used over and over in various applications. The code is repeated in the various applications. User interface features are applied through the manipulation of the document object model that are generated by the standard templates 610 of FIG. 6.

With the use of features, the actual code need not be entered until the last phase of the transformation process, during the feature expansion phase. At that point, predetermined instructions can be substituted in the VXML instructions that correspond to the features. This is done for each of the features that are embedded in the preliminary VXML instructions.

Paying particular attention to Table 7, the script pertaining to "<form id="UsedVoice">" has not expanded the feature named "UsedVoice." However, Table 8 illustrates how the feature named "UsedVoice" as shown in Table 7 is expanded with the appropriate code, as follows:

TABLE 8

```
        </form>
        <form id="UsedVoice">
            <block>
                <if cond="application.lastresult$[0].
Inputmode == 'voice'">
                    <goto
next="#DemoCommonConfirmPhonenumber"/>
                    <else/>
                        <goto next="#AniLookup"/>
                    </if>
            </block>
        </form>
```

Returning now back to flow chart 500 of FIG. 5, in step 530, the present embodiment optimizes the preliminary VXML instructions. Optimization paths are then performed to clean up the code. Optimizations include eliminating redundant states, and combining various "if" conditions together.

As an example of optimization, prior to optimization, the VXML instructions in Table 7 have separate instructions for Form "Used Voice" and for Form "AniLookup," as is illustrated below in Table 9:

TABLE 9

```
        <form id="UsedVoice">
            <block>
                <if cond="UsedVoice( )">
                    <goto
next="#DemoCommonConfirmPhonenumber"/>
                    <else/>
                        <goto next="#AniLookup"/>
                    </if>
            </block>
        </form>
        <form id="AniLookup">
            <block>
                <!-- TODO Please insert functionality for
system state AniLookup of Function:
Data -->
                <goto next="#Registered"/>
            </block>
        </form>
```

However, after optimization, the VXML instructions in Table 9 have been combined such that Form "AniLookup" is eliminated, and its content inserted into the state Form "Used Voice" as is illustrated below in Table 10:

TABLE 10

```
        <form id="UsedVoice">
            <block>
```

TABLE 10-continued

```
<if cond="UsedVoice">
    <goto
next="#DemoCommonConfirmPhonenumber"/>
    <else/>
        <!-- TODO Please insert functionality
for system state AniLookup of Function:
    Data -->
        <goto next="#Registered"/>
    </if>
</block>
</form>
```

Referring back to FIG. 5, each of the steps 510, 520, and 530 can be customized to meet certain output requirements, in accordance with embodiments of the present invention.

In addition, the transformation into the VXML application of the voice interface process includes the generation of necessary and accompanying code written in the Java Script language, in accordance with one embodiment of the present invention. The VXML language integrates Java Script in order to support operations that the VXML language normally cannot support. As such, supporting Java Script code is integrated within the VXML application to support the necessary and accompanying operations representing the voice interface process.

Moreover, each of the steps in the flow charts of FIGS. 2 and 5 are executed automatically, in accordance with one embodiment of the present invention. As such, by inputting the design documents (e.g., the call flow diagram 330 and the master script 335) into the application generator 310, the appropriate VXML instructions in the VXML application of the voice interface can be automatically generated. Correspondingly, HTML documentation of the voice interface process can be generated automatically. In addition, other markup based language documents can be generated automatically, such as quality assurance applications, and other markup based language applications that are representations of the voice interface process.

While the methods of embodiments illustrated in flow charts 200 and 500 show specific sequences and quantity of steps, the present invention is suitable to alternative embodiments. For example, not all the steps provided for in the method are required for the present invention. Furthermore, additional steps can be added to the steps presented in the present embodiment. Likewise, the sequences of steps can be modified depending upon the application.

Embodiments of the present invention, a method and system for the generation of markup language applications (e.g., a VXML application) for a voice interface process, are thus described. While the present invention has been described in particular embodiments, it should be appreciated that the present invention should not be construed as limited by such embodiments, but rather construed according to the below claims.

What is claimed is:

1. A method of transformation comprising:
   a) converting a call flow diagram describing a voice interface process into a list of states in an Extensible Markup Language (XML) format;
   b) creating a lookup table of audio states in said XML format by mapping a plurality of audio prompts and their corresponding textual representations with states of said list of states that play audio files associated with said plurality of audio prompts;
   c) creating an intermediate application in said XML format and from said list of states by merging audio prompts in said lookup table with states of said list of states that play said audio files; and
   d) transforming said intermediate application into a second application of a second format that is a representation of said call flow diagram.

2. The method as described in claim 1, wherein said d) comprises automatically transforming said intermediate application into said second application of said second format that is a static representation of said call flow diagram.

3. The method as described in claim 1, wherein said second format is HyperText Markup Language (HTML), and wherein said second application is a source code for generating a web page comprising a tabular representation of said list of states with links between related states in said list of states.

4. The method as described in claim 1, wherein said second format is VXML.

5. The method as described in claim 4, wherein said d) comprises:
   d1) transforming each of said list of states in said intermediate application into preliminary VXML instructions;
   d2) expanding features embedded in said list of states to be included in said preliminary VXML instructions; and
   d3) optimizing said preliminary VXML instructions.

6. The method as described in claim 5, wherein said d1) comprises:
   applying standard templates for each of the various types of states in said list of states to generate said preliminary VXML instructions.

7. The method as described in claim 5, wherein said d3) comprises:
   eliminating redundant states; and
   combining various "if" conditions.

8. The method as described in claim 1, further comprising:
   receiving said call flow diagram in a Microsoft VISIO format before said a).

9. The method as described in claim 1, further comprising:
   before said b), receiving a Microsoft Excel spreadsheet in a text format comprising said plurality of audio prompts and their corresponding textual representations that are cross referenced with corresponding states in said list of states that play said audio files.

10. A method of transformation comprising:
    a) creating a call flow application by converting a call flow diagram describing a voice interface process into a plurality of states substantially following an Extensible Markup Language (XML) format;
    b) creating a lookup table comprising a plurality of entries in said XML format by associating audio prompts for accessing a plurality of audio files and their corresponding textual representations with corresponding states of said plurality of states that play said plurality of audio files;
    c) merging said call flow application and said lookup table into an XML application that is a high level XML representation of said voice interface process, by incorporating each of said plurality of entries into corresponding states in said call flow application that play audio files; and
    d) transforming said XML application into a second application of a VXML format that is a static representation of said call flow diagram.

11. The method of transformation as described in claim 10, wherein said call flow application is comprised of at least one module representing said plurality of states.

12. The method as described in claim 10, further comprising:
automatically transforming said XML application into said second application of a HyperText Markup Language (HTML) format, and wherein said second application is a source code for generating a web page comprising a tabular representation of said plurality of states with links between related states in said plurality of states.

13. The method as described in claim 10, wherein said d) comprises:
d1) applying standard templates for each of the various types of states in said plurality of states to transform each of said plurality of states as described in said XML application into preliminary VXML instructions;
d2) expanding features included in said plurality of states to be included in said preliminary VXML instructions; and
d3) optimizing said preliminary VXML instructions.

14. The method as described in claim 10, further comprising:
automatically transforming said XML application into a third application of a text format, and wherein said third application is a quality assurance (QA) application that is used for testing performance of said second application.

15. The method as described in claim 10, further comprising:
receiving said call flow diagram in a Microsoft VISIO format before said a).

16. The method as described in claim 10, further comprising:
before said b), receiving a Microsoft Excel spreadsheet in a text format comprising said audio prompts for accessing said plurality of audio files and their corresponding textual representations that are cross referenced with corresponding states in said plurality of states that play said audio files.

17. A method of Extensible Markup Language (XML) transformation comprising:
a) accessing a first input of a plurality of states associated with a voice interface process and complying substantially with an XML format;
b) accessing a lookup table of entries in said XML format that maps a plurality of audio files and their corresponding textual representations with audio states in said plurality of states that play said plurality of audio files;
c) creating an intermediate application in said XML format by merging said audio states with corresponding entries in said lookup table into said plurality of states in said a); and
d) transforming said intermediate application into a second application of a second format that is a detailed low level representation of said call flow diagram.

18. The method as described in claim 17, wherein said c) and said d) comprises, respectively:
c1) automatically creating said intermediate application in said XML format from said plurality of states in said a) by merging said audio states with corresponding entries in said lookup table; and
d1) automatically transforming said intermediate application into said second application of said second format that is a detailed low level representation of said call flow diagram.

19. The method as described in claim 17, wherein said second format is HyperText Markup Language (HTML), and wherein said second application is a source code for generating a web page comprising a tabular representation of said plurality of states with links between related states in said plurality of states.

20. The method as described in claim 17, wherein said second format is VXML.

21. The method as described in claim 17, wherein said second application is of a text format, and wherein said second application is a quality assurance (QA) application.

22. A transformation generator comprising:
a processor; and
a computer readable memory coupled to said processor and containing program instructions that, when executed, implement a method of transformation comprising:
a) converting a call flow diagram describing a voice interface process into a list of states in an Extensible Markup Language (XML) format;
b) creating a lookup table of audio states in said XML format by mapping a plurality of audio prompts and their corresponding textual representations with states of said list of states that play audio files associated with said plurality of audio prompts;
c) creating an intermediate application in said XML format and from said list of states by merging audio prompts in said lookup table with states of said list of states that play said audio files; and
d) transforming said intermediate application into a second application of a second format that is a representation of said call flow diagram.

23. The transformation generator as described in claim 22, wherein said d) comprises automatically transforming said intermediate application into said second application of said second format that is a static representation of said call flow diagram.

24. The transformation generator as described in claim 22, wherein said second format is HyperText Markup Language (HTML), and wherein said second application is a source code for generating a web page comprising a tabular representation of said list of states with links between related states in said list of states.

25. The transformation generator as described in claim 22, wherein said second format is VXML.

26. The transformation generator as described in claim 25, wherein said d) comprises:
d1) transforming each of said list of states in said intermediate application into preliminary VXML instructions;
d2) expanding features embedded in said list of states to be included in said preliminary VXML instructions; and
d3) optimizing said preliminary VXML instructions.

27. The transformation generator as described in claim 26, wherein said d1) comprises:
applying standard templates for each of the various types of states in said list of states to generate said preliminary VXML instructions.

28. The transformation generator as described in claim 26, wherein said d3) comprises:
  eliminating redundant states: and
  combining various "if" conditions.

29. The transformation generator as described in claim 22, further comprising:
  receiving said call flow diagram in a Microsoft VISIO format before said a).

30. The transformation generator as described in claim 22, further comprising:
  before said b), receiving a Microsoft Excel spreadsheet in a text format comprising said plurality of audio prompts and their corresponding textual representations that are cross referenced with corresponding states in said list of states that play said audio files.

* * * * *